US010442126B2

(12) United States Patent
Iuliano et al.

(10) Patent No.: US 10,442,126 B2
(45) Date of Patent: Oct. 15, 2019

(54) COEXTRUSION FEEDBLOCK

(71) Applicant: NORDSON CORPORATION, Westlake, OH (US)

(72) Inventors: Salvatore G. Iuliano, Chippewa Falls, WI (US); Dale P. Pitsch, Jim Falls, WI (US); Michael K. Truscott, Chippewa Falls, WI (US); Brian M. Andrea, Eau Claire, WI (US)

(73) Assignee: Nordson Corporation, Westlake, OH (US)

( * ) Notice: Subject to any disclaimer, the term of this patent is extended or adjusted under 35 U.S.C. 154(b) by 341 days.

(21) Appl. No.: 15/272,296

(22) Filed: Sep. 21, 2016

(65) Prior Publication Data
US 2018/0079123 A1   Mar. 22, 2018

(51) Int. Cl.
*B29C 48/18* (2019.01)
*B29C 48/255* (2019.01)
*B29C 48/30* (2019.01)
*B29C 48/92* (2019.01)
*B29C 48/21* (2019.01)
*B29C 48/49* (2019.01)
*B29C 48/08* (2019.01)
(Continued)

(52) U.S. Cl.
CPC .............. *B29C 48/18* (2019.02); *B29C 48/21* (2019.02); *B29C 48/255* (2019.02); *B29C 48/2556* (2019.02); *B29C 48/30* (2019.02); *B29C 48/304* (2019.02); *B29C 48/49* (2019.02); *B29C 48/92* (2019.02); *B29C 48/08* (2019.02); *B29C 48/2563* (2019.02); *B29C 48/503* (2019.02); *B29C 2948/926* (2019.02); *B29C 2948/92647* (2019.02)

(58) Field of Classification Search
CPC ... B29C 47/06; B29C 47/065; B29C 47/0811; B29C 47/0816
See application file for complete search history.

(56) References Cited

U.S. PATENT DOCUMENTS 4,789,513 A * 12/1988 Cloeren ................ B29C 48/307
  264/173.13
5,047,196 A *  9/1991 Zuckerberg ............. B29C 48/30
  264/173.14

(Continued)

FOREIGN PATENT DOCUMENTS

EP  0294214 A2  12/1988
EP  2979840 A2   2/2016
(Continued)

OTHER PUBLICATIONS

European Patent Application No. 17191387.4; Extended Search Report; dated Feb. 16, 2018; 9 pages.

*Primary Examiner* — Jacob T Minskey
*Assistant Examiner* — Melody Tsui
(74) *Attorney, Agent, or Firm* — Baker & Hostetler LLP

(57) ABSTRACT

A coextrusion feedblock is disclosed having a housing, a central extrusion channel, a coextrusion channel, a rotatable combining plane, a rotatable profile actuator, and a profiled bar mounted removably on the rotatable profile actuator. The central extrusion channel and the coextrusion channel pass through the housing. The rotatable combining plane and the rotatable profile actuator are positioned on opposite sides of the coextrusion channel so as to confront each other.

20 Claims, 14 Drawing Sheets

(51) Int. Cl.
   *B29C 48/25*        (2019.01)
   *B29C 48/50*        (2019.01)

(56)                References Cited

U.S. PATENT DOCUMENTS

| 9,808,980 | B2 | 11/2017 | Truscott |
| 2009/0194901 | A1 | 8/2009 | Nakamura |
| 2013/0234359 | A1* | 9/2013 | Ulcej ...................... B29C 48/92 |
| | | | 264/171.1 |
| 2015/0104535 | A1* | 4/2015 | Truscott .................. B29C 48/31 |
| | | | 425/376.1 |

FOREIGN PATENT DOCUMENTS

| JP | 02-286217 A | | 11/1990 | |
| JP | 02286217 A | * | 11/1990 | ......... B29C 48/2556 |
| JP | 07-001560 A | | 1/1995 | |
| JP | 2002-221620 A | | 8/2002 | |

* cited by examiner

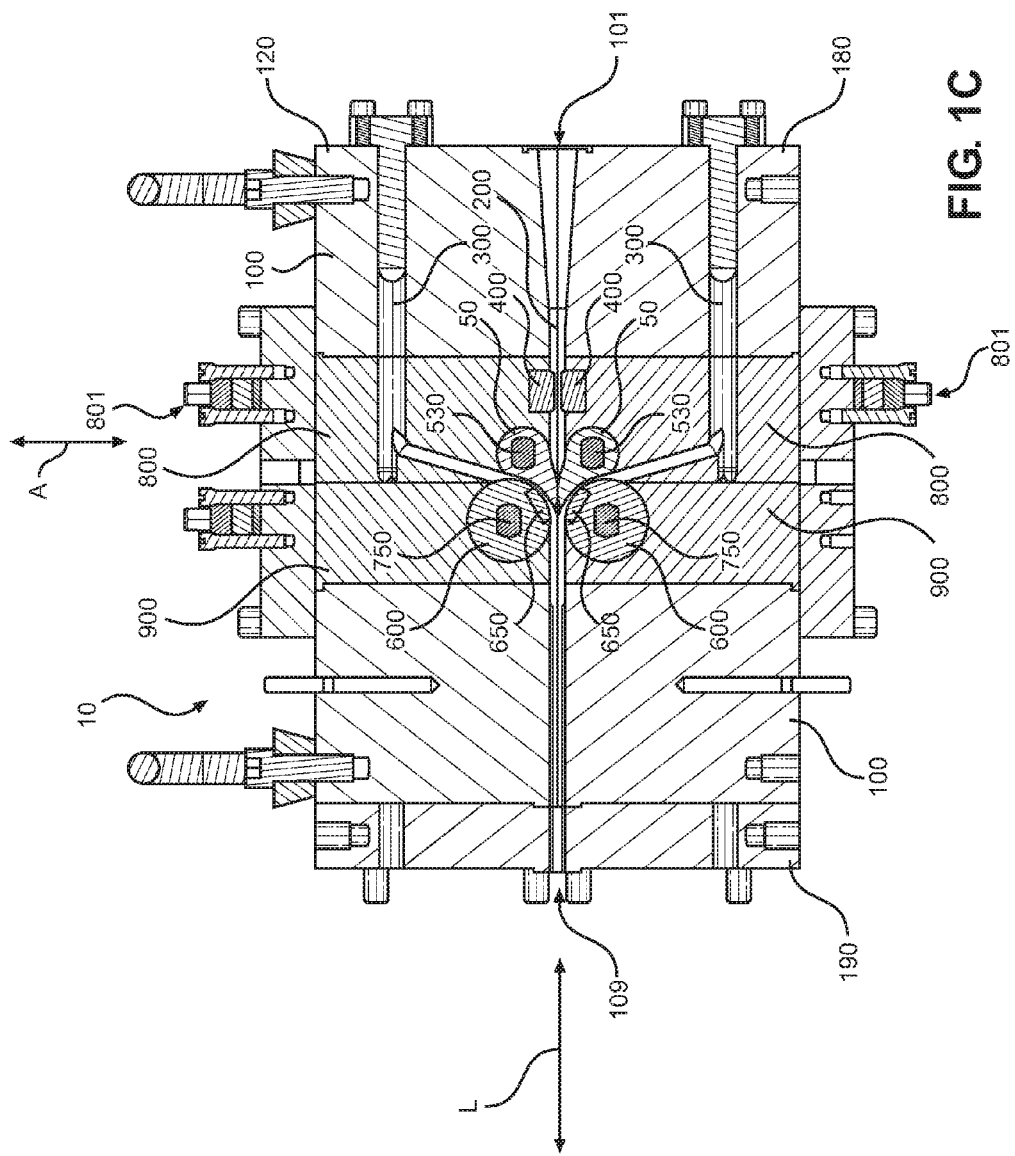

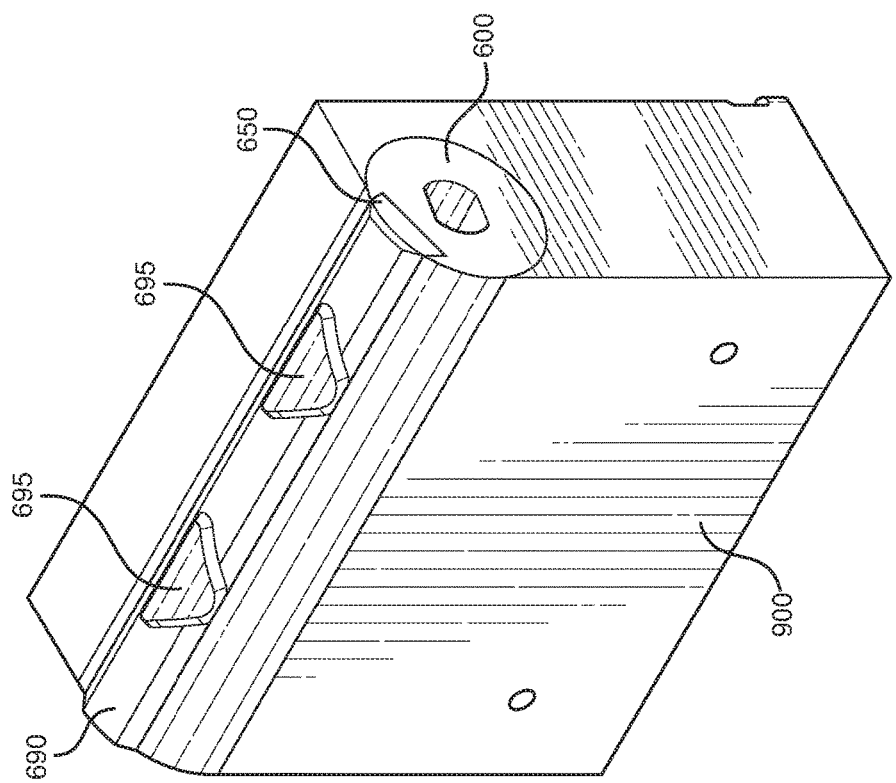
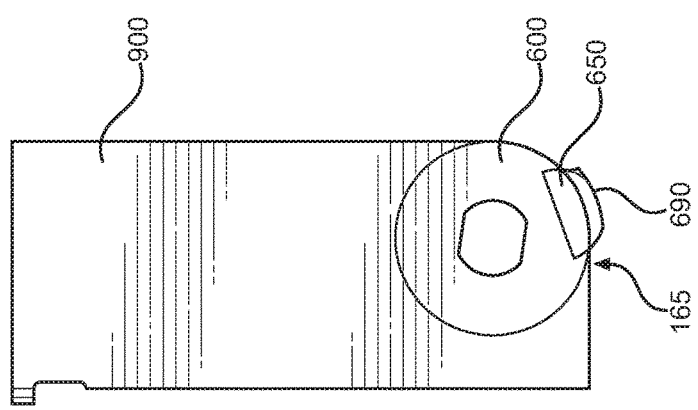

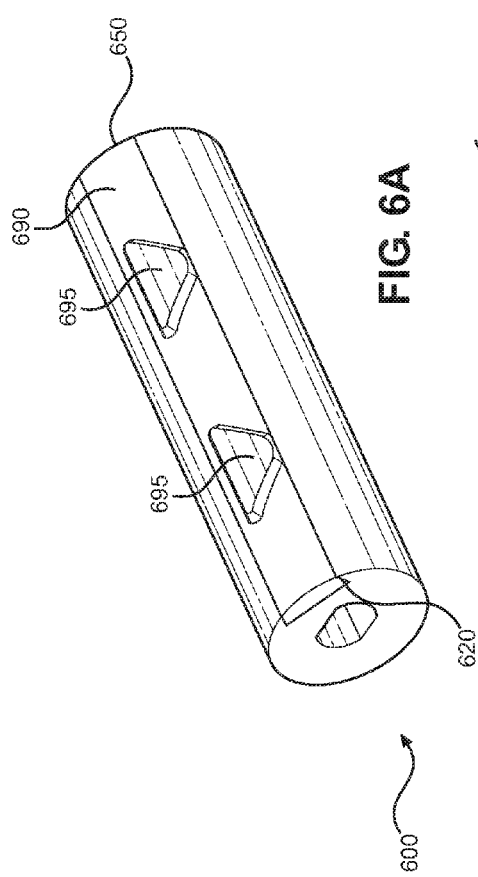
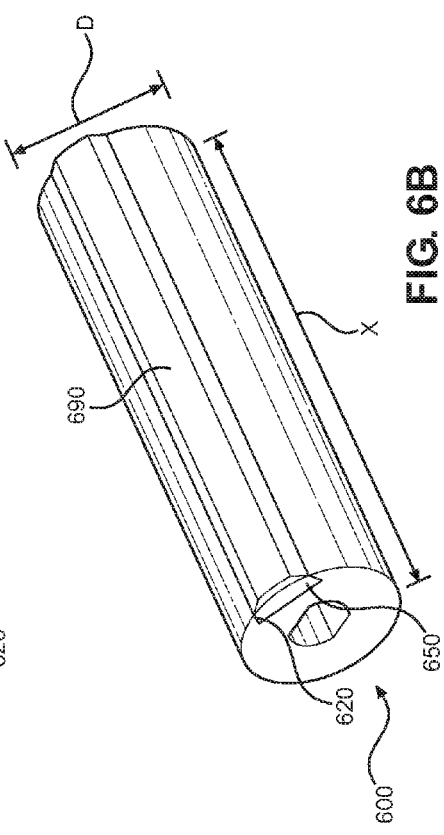

COEXTRUSION FEEDBLOCK

TECHNICAL FIELD

This disclosure generally relates to extrusion devices and, more specifically, relates to coextrusion feedblocks.

BACKGROUND

Coextrusion feedblocks are used for bringing together molten streams of thermoplastic materials from multiple extruders. The individual streams from different extruders are brought together in the coextrusion feedblock to form particular multi-layer arrangements. The resulting multi-layer extrudate flow is then delivered to a subsequent extrusion die, or another downstream tool, to produce the desired composite coextrusion structure.

In the process of bringing together multiple streams of different plastic materials, the different materials commonly have different properties. For example, different plastics tend to exhibit different viscosities. The variations in viscosity or other properties can adversely impact the layer uniformity of the resulting multi-layer coextrusion structure. To compensate for this, it is sometimes desirable to adjust the profile of one or more of the channels through which the different streams pass. In the past, this has been attempted by using certain types of profiling systems.

Existing profiling systems have not been ideal for all applications, have had particular limitations, and could be improved in several ways. For example, the impact and/or adjustment capabilities of existing profiling components on coextrusion flow channels are limited. In addition, conventional profiling systems only have adjustability for the coextrusion flow channels. Further, some profiling systems require off-line tuning for all profile adjustment assemblies, meaning extrusion must be stopped and every profiling component removed and profiled by machining and polishing. Still further, some known profiling components are limited in terms of the types of adjustment assemblies they can affect. Further yet, many conventional coextrusion feedblocks are limited in terms of their ability to control distortion when delivering extrudate from the feedblock into a die, which involves the extrudate spreading into the final film, sheet, or coating.

It would be desirable to provide a coextrusion feedblock that has one or more profiling components for one or more coextrusion channels. It would be particularly desirable to provide one or such more profiling components that can be adjusted in situ (i.e., while in the feedblock, without having to remove such component(s) from the feedblock). It would also be particularly desirable to provide a profiling system that is configured to make both course and fine adjustment assemblies for one or more coextrusion channels.

Further, in some cases, it would be desirable to provide a coextrusion feedblock that has one or more profiling components for the main (or "central") flow channel, as well as profiling components for one or more coextrusion channels. Still further, it would be desirable to provide a combination of profiling components (e.g., for one or more coextrusion channels, and optionally also for the main flow channel) that can provide an adjustment impact and a range of adjustment iterations that are better than conventional profiling systems. Finally, in some cases, it would be desirable to provide a coextrusion feedblock that is configured to minimize distortion during delivery of extrudate from the feedblock into a die, and during the resulting spreading of the extrudate into the final film, sheet, or coating.

SUMMARY

A coextrusion feedblock is disclosed having a housing, a central extrusion channel, a coextrusion channel, a rotatable combining plane, a rotatable profile actuator, and a profiled bar mounted removably on the rotatable profile actuator. The central extrusion channel and the coextrusion channel pass through the housing. The rotatable combining plane and the rotatable profile actuator are positioned on opposite sides of the coextrusion channel so as to confront each other. Preferably, the rotatable profile actuator is configured such that (a) rotation in a first direction increases a profiling impact the rotatable profile actuator has on polymer flowing through the coextrusion channel and (b) rotation of the rotatable profile actuator in a second direction decreases the profiling impact the rotatable profile actuator has on polymer flowing through the coextrusion channel.

BRIEF DESCRIPTION OF THE DRAWINGS

The following drawings are illustrative of particular embodiments and do not limit the scope of the claims. The drawings are not necessarily to scale and are intended for use in conjunction with the explanations provided in the following detailed description. Embodiments will hereinafter be described in connection with the appended drawings, wherein like numerals denote like elements.

FIG. 1C is a cross-sectional view of the coextrusion feedblock of FIG. 1A.

FIG. 5A is a side view of a removable distribution insert block of the coextrusion feedblock of FIG. 1A.

FIG. 5B is a perspective view of the removable distribution insert block of FIG. 5A.

FIG. 6A is a perspective view of a rotatable profile actuator of the distribution insert block of FIG. 5A.

FIG. 6B is a perspective view of another rotatable profile actuator for use on the distribution insert block of FIG. 5A.

DETAILED DESCRIPTION

The following detailed description is exemplary in nature and is not intended to limit the scope, applicability, or configuration of the claims. The description provides practical illustrations for implementing certain preferred embodiments. Examples of constructions, materials, dimensions, and manufacturing processes are provided for selected elements; all other elements employ that which is known to those of ordinary skill. Those skilled in the art will recognize that many of the given examples have a variety of suitable alternatives.

Figure 1A:
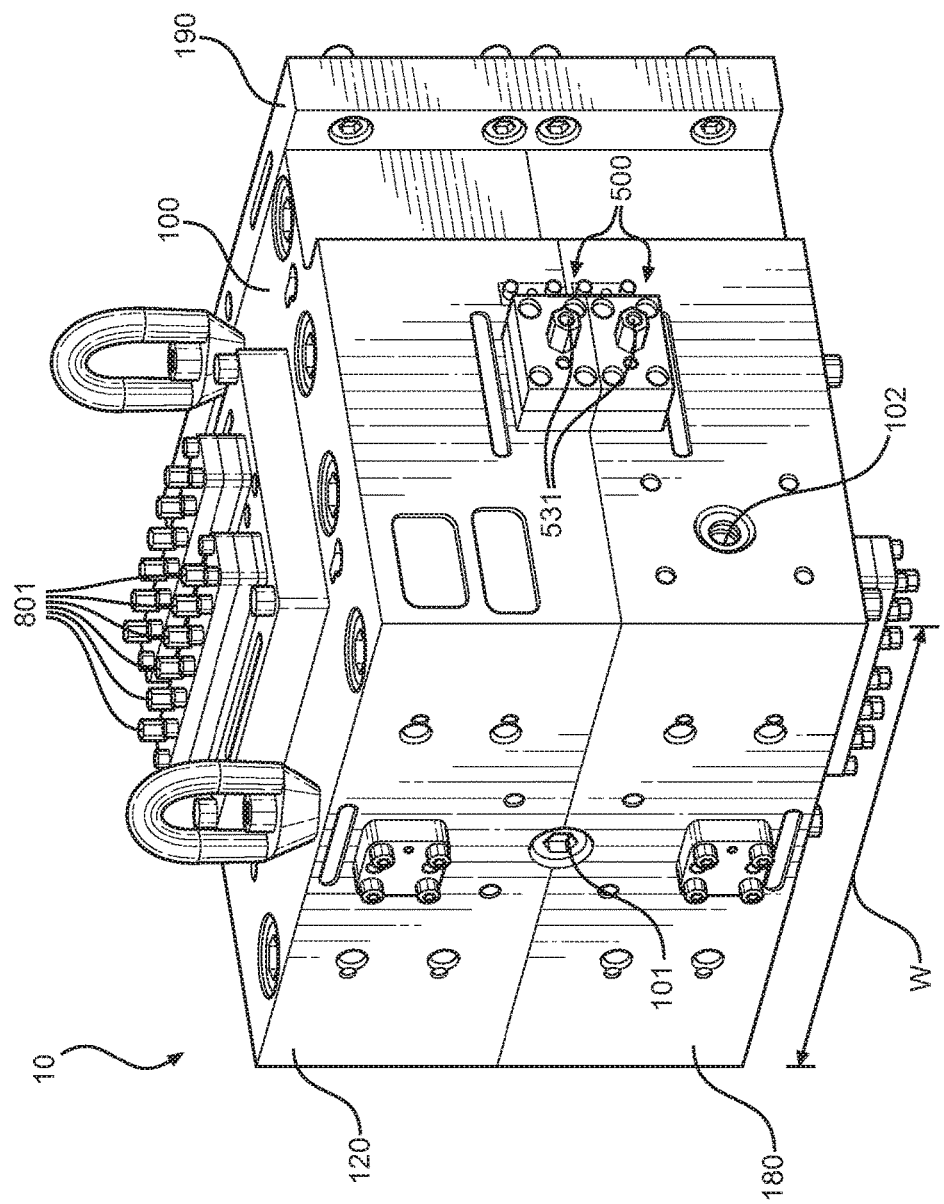
FIG. 1A is a perspective view of a coextrusion feedblock in accordance with one embodiment.
Figure 1B:
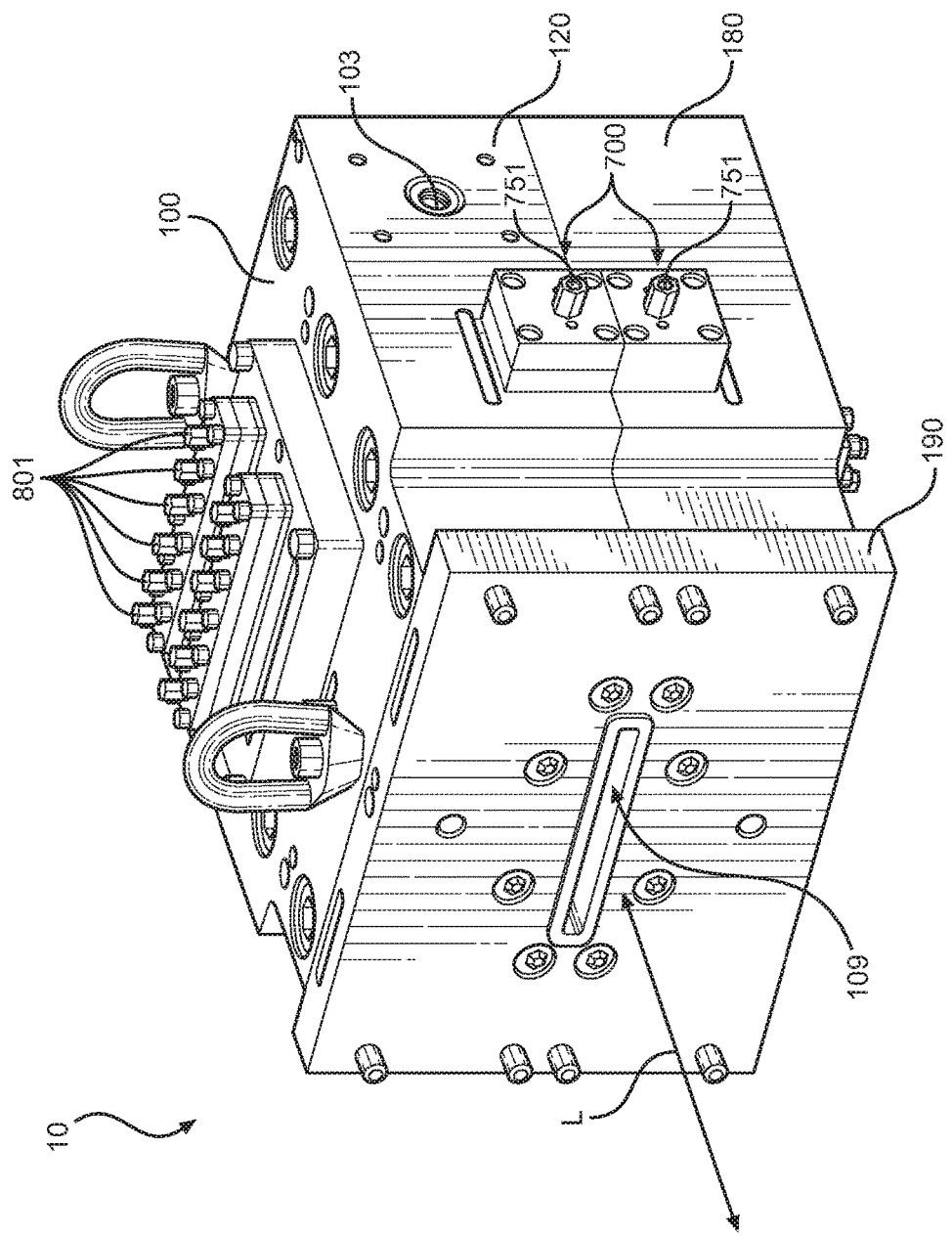
FIG. 1B is another perspective view of the coextrusion feedblock of FIG. 1A.

With reference to FIGS. 1A-1C, a coextrusion feedblock 10 is illustrated. The feedblock 10 has a housing 100, a central (or "main") extrusion channel 200, a coextrusion channel 300, a rotatable combining plane 50, a rotatable profile actuator 600, and a profiled bar 650 mounted removably on the rotatable profile actuator. The central extrusion channel 200 and the coextrusion channel 300 pass through the housing 100. The rotatable combining plane 50 and the rotatable profile actuator 600 are positioned on opposite sides of the coextrusion channel 300, preferably so as to confront each other.

The feedblock housing 100 preferably comprises first blocks 120 and second blocks 180 joined together. The central extrusion channel 200 extends along a path located at an interface between these two blocks 120, 180. Thus, the two blocks 120, 180 collectively surround, and are each exposed to (e.g., bound on four sides), the central extrusion channel 200. In other embodiments, a single block can define both halves of the feedblock. In still other embodiments, two side plates can be provided respectively on the two lateral sides of two blocks that are similar to those illustrated but are configured such that the side plates define the internal lateral side walls of the central extrusion channel while the two blocks sandwiched between the side plates define the internal top and bottom walls of the central extrusion channel.

In the illustrated embodiments, the feedblock 10 has an extrusion inlet 101 to which an extruder is (during use) operably coupled to feed a supply of polymer into the central extrusion channel 200. The feedblock 10 also has one or more coextrusion inlets 102, 103 to which one or more additional extruders are (during use) operably coupled to feed polymer into the coextrusion conduit(s) 300. It is to be appreciated that the inlets 101, 102, 103 can be provided at various different locations on the feedblock. Moreover, a single inlet on the feedblock can alternatively be provided to supply polymer to two or more coextrusion conduits. The illustrated feedblock 10 has an output plate 190, although this will not always be required.

In the embodiments illustrated, the width Z of the central extrusion channel 200 preferably is greater than six inches, such as about 7 inches. This reduces the spread ratio to the final die width. In this way, coextrusion stability is improved. This also provides for better, more intuitive layer profiling. Thus, the width Z of the central extrusion channel 200 preferably is greater than six inches, such as about 7 inches. It is to be appreciated, however, that the central extrusion channel 200 can alternatively have a conventional/smaller width.

Figure 10:
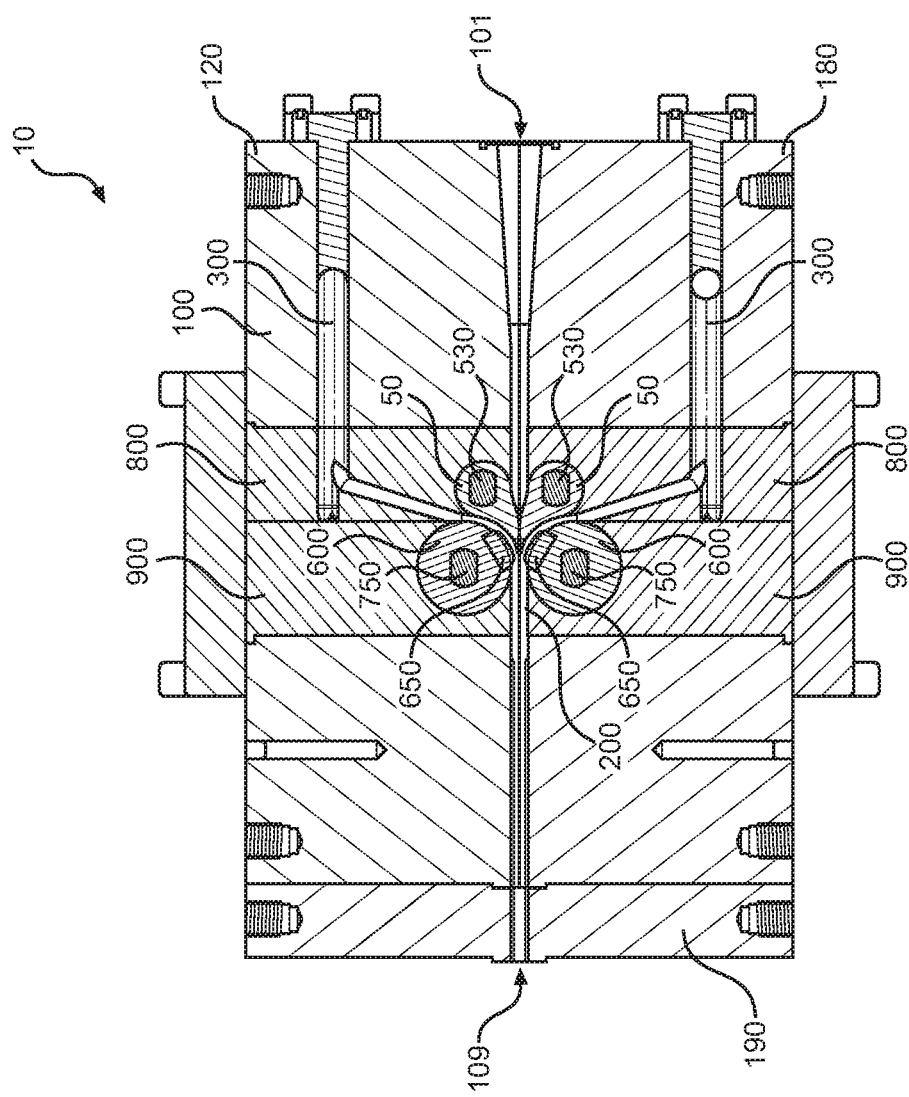
FIG. 10 is a cross-sectional view of a coextrusion feedblock in accordance with still another embodiment.

The configuration of the central extrusion channel 200 can be varied to suit many different applications. In FIGS. 1A-1C, a single central extrusion channel 200 extends along a straight path located in the middle of the feedblock 10. This is also the case in the embodiment of FIG. 8 and the embodiment of FIG. 10. It is not, however, required that the central extrusion channel be located at the middle of the feedblock. Instead, it may be closer to the top or bottom of the feedblock. The central channel may be curved or angled, although it will generally be desirable to minimize the flow resistance in the channel. Moreover, in some cases, layers from one or more coextrusion channels are applied to one side, but not both sides, of the core layer delivered from the central channel. In such cases, one or more coextrusion channels (as well as one or more rotatable profile actuators and one or more rotatable combining planes) are located on one side of the central extrusion channel, but not on the other side.

Figure 8:
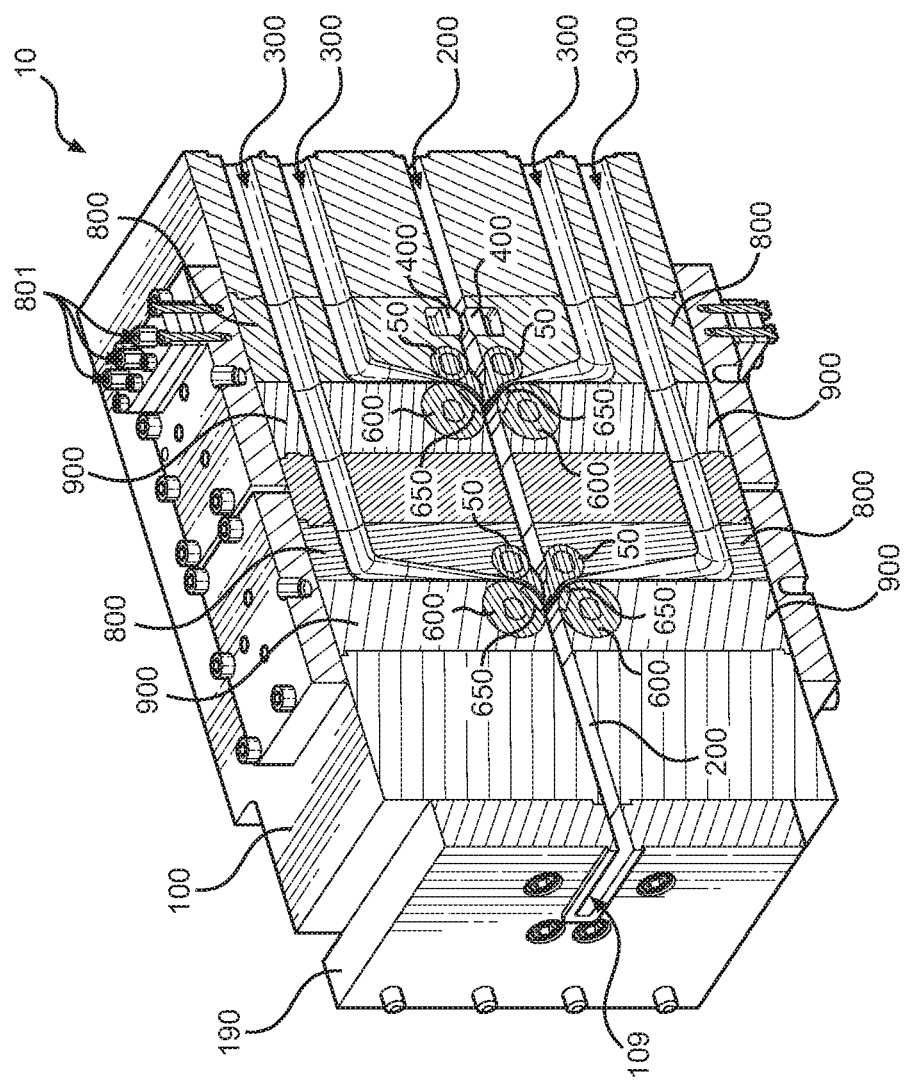
FIG. 8 is a cross-sectional view of a coextrusion feedblock in accordance with another embodiment.

In FIGS. 1A-1C, the coextrusion feedblock 10 has a single central extrusion channel 200 and two coextrusion channels 300. This is also the case in the embodiment of FIG. 10. Feedblocks of this nature will commonly be used to produce a 3-layer extrusion structure. Skilled artisans will appreciate, however, that a single or double-layer extrusion structure can be produced with such a feedblock 10. This can be done, for example, by not using and closing one or both of the illustrated coextrusion channels 300. More generally, the number and arrangement of coextrusion channels 300 can be varied to accommodate many different applications. The feedblock, for example, can alternatively have a single coextrusion channel. As another example, when a 5-layer coextrusion structure is desired, the feedblock will typically have four coextrusion channels. FIG. 8 shows one embodiment of this nature. As still another example, when a 7-layer coextrusion structure is desired, the feedblock will typically have six coextrusion channels.

The coextrusion channel 300 has a height (or "gap height"), a width, and a length. In the embodiments illustrated, the width of the coextrusion channel 300 is equal to the width of the central extrusion channel 200, at least where the coextrusion channel intersects the central extrusion channel. While this will commonly be the case, it is not required. As described below, the feedblock 10 is configured such that the height of the coextrusion channel 300 is adjustable.

With continued reference to the embodiment of FIGS. 1A-1C, extrudate is fed into the feedblock 10 through an inlet region of the coextrusion channel 300. A first section of the coextrusion channel 300 extends through the housing 100 of the feedblock 10, while a second section extends through a coextrusion insert block 800 (described below). The coextrusion channel 300 then extends between the rotatable combining plane 50 and the rotatable profile actuator 600. Reference is made to FIG. 1C, as well as FIGS. 8 and 10.

The present disclosure describes various features of a coextrusion channel 300. In cases where the feedblock 10 has multiple coextrusion channels 300, the features discussed herein for a coextrusion channel can optionally be present for each coextrusion channel. The same is true for the descriptions herein of other components and features that are, or optionally can be, present in pairs or other multiples.

In the embodiments illustrated, two coextrusion channels 300 change directions and converge toward each other, and toward the central extrusion channel 200, within two coextrusion insert blocks 800. Each coextrusion channel, however, can be designed to follow different paths through the feedblock.

Further, in the embodiments illustrated, each coextrusion channel 300 opens into the central channel 200, such that the secondary extrudate flow in each coextrusion channel merges with the extrudate flow in the central channel, thus producing a multi-layer extrudate flow. The layer delivered from the central channel is referred to as the core layer. One or more layers from the coextrusion conduit(s) are layered onto the core layer. The resulting multi-layer extrudate flow moves along the remainder of the central extrusion channel 200 until reaching the outlet 109. From the outlet 109, the multi-layer extrudate flow may be delivered to an extrusion die or another downstream tool, such as a layer multiplier or another feedblock.

Figure 7A:
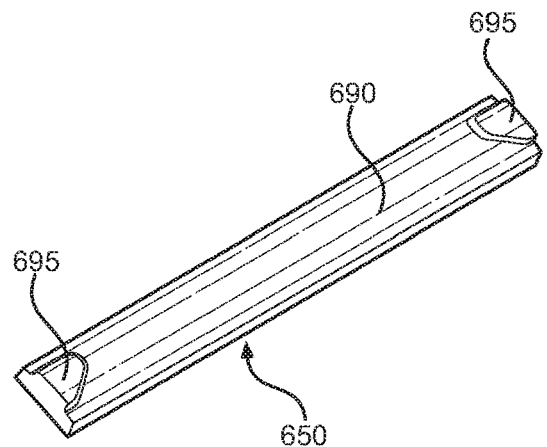
FIG. 7A is a perspective view of a removable profiled bar for use on the rotatable profile actuator of FIG. 6A.
Figure 7B:
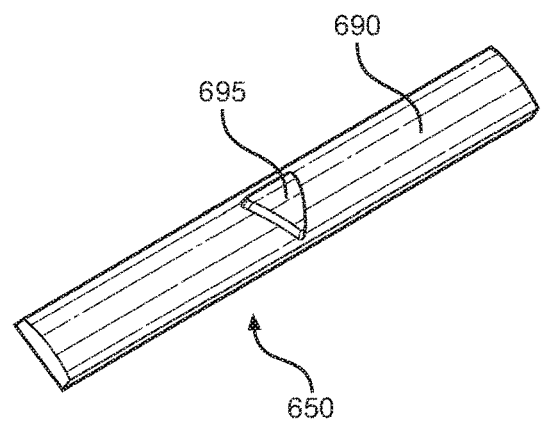
FIG. 7B is a perspective view of another removable profiled bar for use on the rotatable profile actuator of FIG. 6A.
Figure 7C:
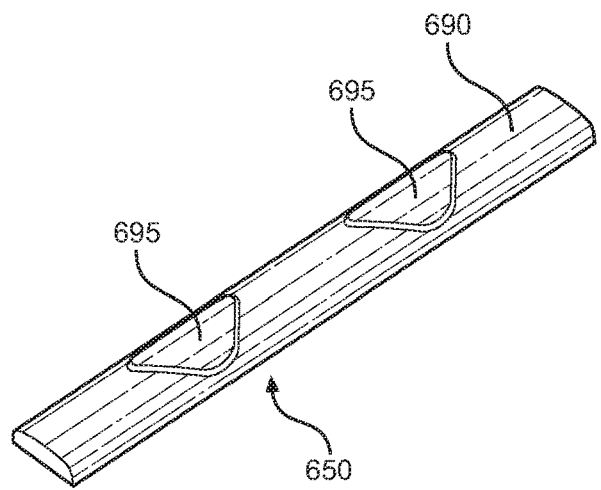
FIG. 7C is a perspective view of still another removable profiled bar for use on the rotatable profile actuator of FIG. 6A.

The rotatable profile actuator 600 is positioned to contact (e.g., to profile) polymer flowing through the adjacent coextrusion channel 300. This is the case in the embodiment of FIG. 1C, as well as in the embodiments of FIGS. 8 and 10. In some cases, the rotatable profile actuator 600 is configured (e.g., shaped) to profile polymer flowing through the adjacent coextrusion channel 300. For example, the profiled bar 650 on the rotatable profile actuator 600 can optionally have a profiling face 690 with one or more raised regions 695. Three examples are shown in FIGS. 7A-7C.

The polymer flowing through the coextrusion channel 300 preferably does not flow through the rotatable profile actuator 600. Rather, polymer flowing through the coextrusion channel 300 preferably flows alongside (so as to contact) the adjacent rotatable profile actuator 600. Thus, the rotatable profile actuator 600 preferably is positioned and configured such that polymer flowing through the adjacent coextrusion channel 300 flows alongside the rotatable profile actuator, but not through it.

As noted above, a profiled bar (or "distribution bar") 650 is mounted removably on the rotatable profile actuator 600. The profiled bar 650 preferably defines a removable portion of a perimeter 165 of the rotatable profile actuator 600. FIGS. 5A-6B detail one particular design wherein the rotatable profile actuator 600 has an axially-elongated groove (e.g., a dovetail groove) 620 in which the profiled bar 650 is mounted removably. In the embodiments illustrated, the profiled bar 650 is sized to extend along an entire width of the adjacent coextrusion channel 300, but not along the entire width W of the feedblock housing 100. The length of the profiled bar 650 preferably is greater than 6 inches, such as about 7 inches.

In other embodiments, the profiled bar does not extend along the entire width of the adjacent coextrusion channel. The profiled bar, for example, can span less than the entire length of the rotatable profile actuator. The illustrated profiled bar is a single piece, which preferably has a solid (i.e., not hollow) construction. Oher embodiments provide the profiled bar in the form of multiple segments mounted side-by-side on the rotatable profile actuator so as to collectively span the entire length, or a desired portion of the length, of the rotatable profile actuator. Depending on the flow situation to be addressed, these segments may be spaced-apart from each other. Further, some embodiments may involve only a single segment, or insert, mounted removably on the rotatable profile actuator.

The profiled bar 650 defines a profiling face 690 of the rotatable profile actuator 600. By rotating the profile actuator 600 to a desired rotational orientation, the profiling face 690 can be moved into (or further into, or to a different position in) the flow-path of the adjacent coextrusion channel 300. Since the profiled bar 650 is mounted removably on the rotatable profile actuator 600, it is possible to use a first profiled bar on the profile actuator during a first production run, and to subsequently remove the first profiled bar and replace it with a second profiled bar (having a differently shaped profiling face) for a second production run.

In FIGS. 5B, 6A, and 7A-7C, the profiled bar 650 has a distinctively contoured profiling face 690. In embodiments of this nature, the contour of the profiling face 690 is shaped to change the profile (e.g., distribution) of polymer flowing through the adjacent coextrusion channel.

Profiling face 690 can be machined or otherwise formed to have any of a variety of different contours. The contour shown in FIG. 6A is characterized by two raised triangular regions 695. This particular configuration may be desirable for "M" or "W" pattern situations. This, however, is merely one example. Many other contours may be desirable depending upon the uniformity situation being addressed. For example, FIG. 7A shows a configuration that may be desirable for heavy end flow situations. As another example, FIG. 7B shows a configuration that may be desirable for heavy center flow situations. The contour shown in FIG. 7B is characterized by a single raised triangular region 695. Thus, in many cases, the contour of the profiling face is characterized by one or more raised regions 695.

Preferably, the rotatable profile actuator 600 is configured such that its rotation in a first direction increases the magnitude of the profiling impact it has on polymer flowing through (or from) the adjacent coextrusion channel 300, whereas its rotation in a second direction decreases the magnitude of the profiling impact it has on polymer flowing through (or from) the adjacent coextrusion channel. For example, the profile actuator 600 can be rotatable between first and second orientations. In such cases, when the rotatable profile actuator 600 is in its first orientation, it is positioned to have maximum profiling impact on polymer flowing through (or from) the adjacent coextrusion channel 300, and when in the second orientation, the rotatable profile actuator is positioned to have minimum profiling impact on polymer flowing through (or from) the adjacent coextrusion channel. In some cases, this minimum profiling impact may be no profiling impact. For example, in alternate embodiments, the profile actuator may actually be rotated entirely out of engagement with polymer flowing through the adjacent coextrusion channel.

In some cases, the rotatable profile actuator 600 is configured such that its rotation in a first direction causes the profiling face 690 of the profiled bar 650 to move to one position in the adjacent coextrusion channel 300 (e.g., a position closer to the central extrusion channel 200), whereas rotation in a second direction causes the profiling face of the profiled bar to move to another position in the adjacent coextrusion channel (e.g., a position further from the central extrusion channel 200).

In the embodiment of FIGS. 1A-1C, if the rotatable profile actuator 600 is rotated such that the profiled bar 650 it carries moves generally away from the central extrusion channel 200, then the profiling face 690 of that profiled bar is moved to a position where it has less profiling impact on polymer flowing through the adjacent coextrusion channel 300. By contrast, if the rotatable profile actuator 600 is rotated such that the profiled bar 650 it carries moves generally toward the central extrusion channel 200, then the profiling face 690 of that profiled bar is moved to a position where it has more profiling impact on polymer flowing through the adjacent coextrusion channel 300. This is also the case in the embodiments of FIGS. 8 and 10. Thus, if it is desired to decrease the magnitude of the profiling impact that the profiling face 690 of the profiled bar 650 has on polymer flowing through the adjacent coextrusion channel 300, then the rotatable profile actuator 600 can be rotated such that the profiled bar it carries moves generally away from the central extrusion channel 200. In contrast, if it is desired to increase the magnitude of the profiling impact that the profiling face 690 of the profiled bar 650 has on polymer flowing through the adjacent coextrusion channel 300, then the rotatable profile actuator 600 is rotated such that the profiled bar it carries moves generally toward the central extrusion channel 200.

In the illustrated embodiments, if the profiling bar 650 is at (e.g., faces toward) the combination point, then its profiling (or "redistribution") effect is maximized. Rotating it to its most upstream position (e.g., so as to face the adjacent coextrusion channel) minimizes its profiling effect. Rotating through all the positions between these extremes will provide the user with a variety of profiling variations (from significantly diluted profiling to strongly accentuated profiling). Thus, the illustrated profile actuator 600 is configured to be rotatable through a range of rotational orientations, each of which corresponds to a unique profiling magnitude or effect.

The illustrated profile actuator 600 is elongated in a direction crosswise to (e.g., substantially perpendicular to) the longitudinal axis L of the central extrusion channel 200. Preferably, the profile actuator 600 spans an entire width of the adjacent coextrusion channel 300, but does not span the entire width W of the feedblock housing 100. The length of the rotatable profile actuator 600 preferably is greater than 6 inches, such as about 7 inches.

In the embodiment of FIGS. 1A-1C, the rotatable profile actuator 600 comprises a rod. This is also the case in the embodiments of FIGS. 8 and 10. This rotatable rod ("profiling rod") preferably has a diameter of 1.5 inches or greater. By providing such a large diameter, the profiling rod presents an elongated land distance over which the rotatable profile actuator contacts polymer flowing alongside it. This makes it possible to have a major profiling impact on polymer flowing through the adjacent coextrusion channel 300. It also makes it possible to change the magnitude of the profiling impact substantially by simply rotating the profiling rod into different orientations. While the diameter of the profiling rod will vary depending upon such variables as the size of the feedblock, the profiling rod will commonly have a diameter in the range of from 1.5 inches to 5 inches. In one non-limiting example, the diameter is about 2 inches.

The preferred profiling rod can thus be described as oversized. As noted above, the oversized nature of the preferred profiling rod can enhance the profiling impact of the rod. It also makes the rod capable of providing a range of profiling impact levels. In preferred embodiments, the oversized nature is characterized by the profiling rod having an effective volume of greater than 15 cubic inches, such as in the range of from 18 cubic inches to 120 cubic inches. The term "effective volume" is defined herein as meaning the cylinder radius (which is D divided by 2) squared multiplied by pi and multiplied by the cylinder length X.

The rotatable profile actuator 600 can optionally have first and second profiling faces. In such cases, the first profiling face has a first contour, the second profiling face has a second contour, and these two contours are different (i.e., are shaped differently). In embodiments of this nature, the rotatable profile actuator is rotatable between first and second orientations, the first profiling face faces (e.g., projects into the flow path of) the adjacent coextrusion channel when in the first orientation, and the second profiling face faces (e.g., projects into the flow path of) the adjacent coextrusion channel when in the second orientation. Thus, when such a rotatable profile actuator is in its first orientation, it is configured to give polymer flowing through the adjacent coextrusion channel a first profile, whereas when the profile actuator is in its second orientation, it is configured to give polymer flowing through the adjacent coextrusion channel a second profile, which is different from the first profile.

In some cases, the first profiling face of the rotatable profile actuator is defined by the profiled bar mounted removably on the profile actuator. In such cases, the second profiling face of the profile actuator can optionally be defined by the regular perimeter of the profile actuator itself. Alternatively, it can be defined by a second profiled bar mounted removably on the rotatable profile actuator.

Figure 9B:
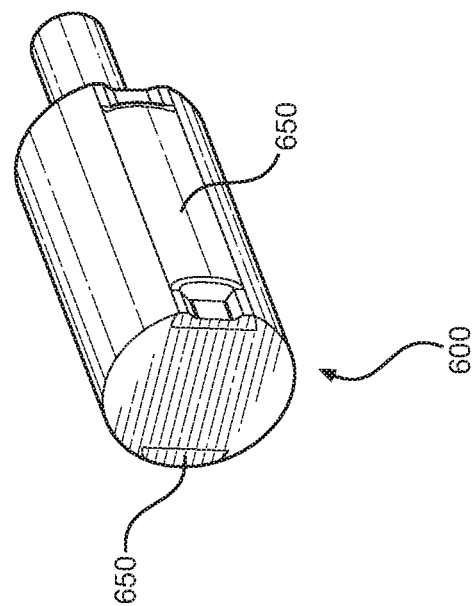
FIGS. 9A and 9B are perspective views, taken from different perspectives, of a rotatable profile actuator in accordance with another embodiment.
Figure 9A:
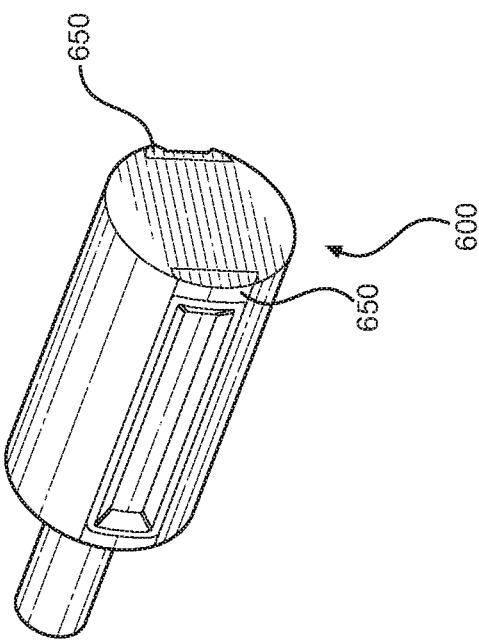

Reference is made to FIGS. 9A and 9B, which depict a rotatable profile actuator 600 having first and second profiled bars 650 mounted removably at positions spaced part from each other about a circumference of the rotatable profile actuator. The two illustrated profiled bars 650 have two respective profiling faces of different contour. Either one of the two profiled bars 650 can be positioned to profile polymer flow through the adjacent coextrusion channel by rotating the profile actuator 600 into a desired one of first and second orientations.

If desired, the rotatable profile actuator can further include a third profiling face. When provided, the third profiling face has a third contour, which is different from the first and second contours. Thus, in some cases, the profile actuator is rotatable among first, second, and third orientations. The first profiling face faces (e.g., projects into the flow path of) the adjacent coextrusion channel when in the first orientation, whereas second profiling face faces (e.g., projects into the flow path of) the adjacent coextrusion channel when in the second orientation, and the third profiling face faces (e.g., projects into the flow path of) the adjacent coextrusion channel when in the third orientation. Thus, when the rotatable profile actuator is in its first orientation, it is configured to give polymer flowing through the adjacent coextrusion channel a first profile, whereas when the rotatable profile actuator is in its second orientation, it is configured to give polymer flowing through the adjacent coextrusion channel a second profile, which is different from the first profile, and when the rotatable profile actuator is in its third orientation, it is configured to give polymer flowing through the adjacent coextrusion channel a third profile, which is different from both the first and second profiles.

As noted above, the first profiling face of such a rotatable profile actuator is defined by the profiled bar mounted removably on the profile actuator. In such cases, the second and third profiling faces of the profile actuator can optionally be defined respectively by second and third profiled bars mounted removably on the rotatable profile actuator. For example, a rotatable profile actuator can optionally carry three profiled bars (e.g., such as the three types of profiled bars shown in FIGS. 7A-7C). Three profiled bars can, for example, be mounted removably at three respective locations spaced apart about the circumference of the profile actuator. Alternatively, one or more profiling faces of the profile actuator can be defined by the regular perimeter of the profile actuator itself.

Thus, the rotatable profile actuator can optionally have multiple different profiling faces, which can be rotated selectively into the flow path of the adjacent coextrusion channel. If desired, the rotatable profile actuator can have more than three such profiling faces, each with a unique contour.

The feedblock 10 preferably includes an actuator 700 configured to rotate the profile actuator 600. The actuator 700 can optionally be external to the feedblock housing. In more detail, the feedblock 10 preferably has an actuator 700 coupled with the rotatable profile actuator 600 such that the profile actuator rotates among different orientations (e.g., between first and second orientations) in response to actuation of actuator 700. The illustrated actuator 700 comprises a control shaft 750 having an end 751 that is external to the feedblock 10. Thus, the actuator can optionally be an external actuator.

Thus, the illustrated profile actuator 600 rotates in response to rotation of a control shaft 750. The resulting rotation of the profile actuator 600 is about an axis that is substantially parallel to the width of the coextrusion channel 300. As shown in FIG. 1B, one end 751 of the illustrated control shaft 750 is externally accessible and can be rotated by an operator to rotate the control shaft, thereby rotating the profile actuator 600. Thus, one end 751 of the illustrated control shaft 750 serves as a controller for the rotatable profile actuator 600. As shown in FIG. 1C, the illustrated control shaft 750 (e.g., a portion thereof) has a polygonal exterior configuration matching a polygonal interior configuration of a key opening in the rotatable profile actuator 600. Thus, when a portion of the control shaft 750 is mounted within the key opening in the rotatable profile actuator 600, the control shaft and the rotatable profile actuator are keyed together for conjoint rotation. Other mechanisms can alternatively be used to rotate the profile actuator 600.

The rotatable profile actuator 600 preferably is adapted to be locked against further rotation once it has been adjusted to a desired rotational orientation. The rotatable profile actuator 600 may have a lock system comprising a brake that, when engaged, restrains the respective control shaft 750 against rotation. For example, one or more lock screws can be provided adjacent to an external end 751 of the control shaft 750. By loosening such lock screw(s), the profile actuator 600 is released for rotation. The profile actuator 600 can then be adjusted by rotating it to a desired rotational orientation, at which point by tightening the lock screw(s), a brake pad can be forced against the respective control shaft 750, thereby restraining it against further rotation. It is to be appreciated that many other lock systems can be used.

Figure 2:
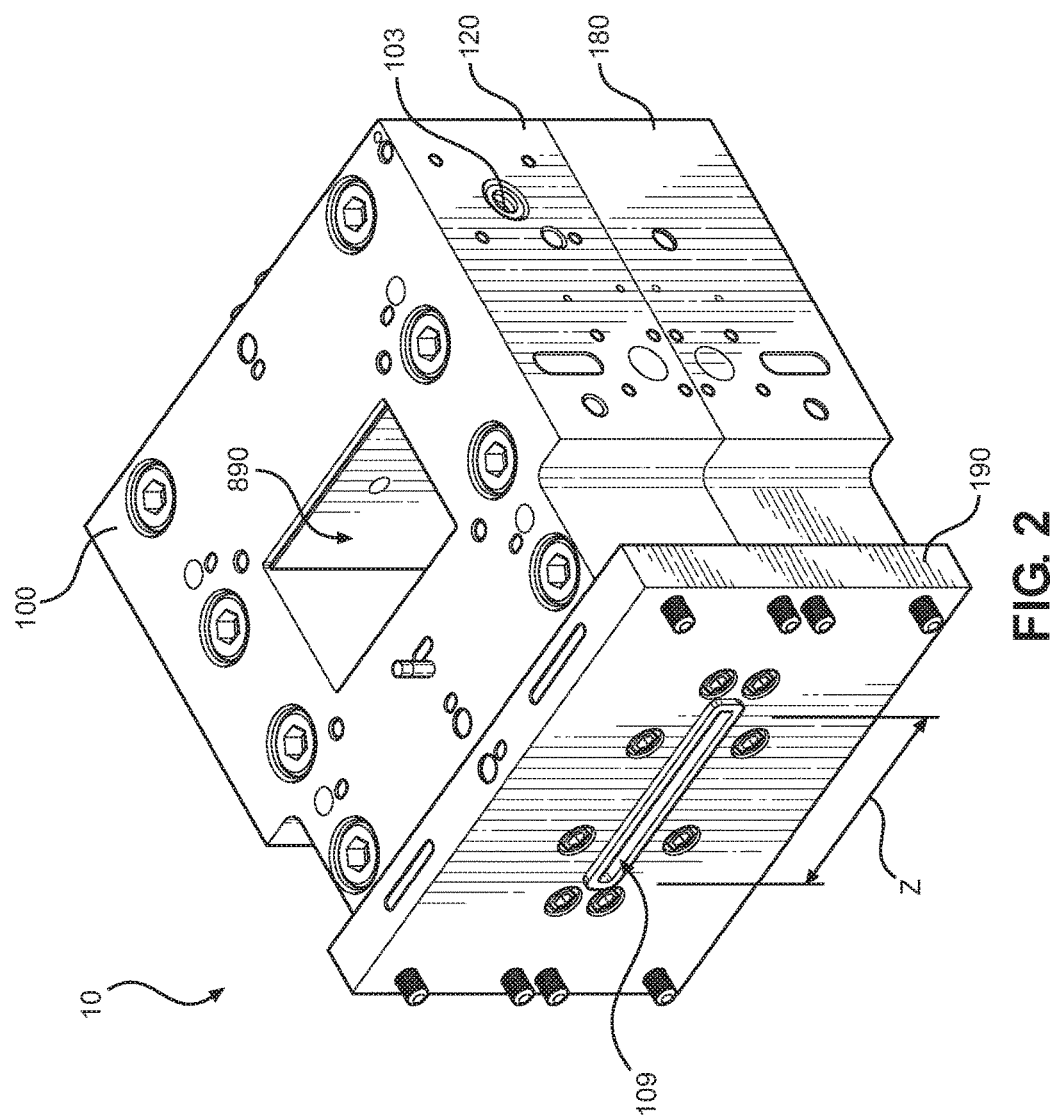
FIG. 2 is a perspective view of a coextrusion feedblock housing in accordance with certain embodiments, with the coextrusion insert blocks and distribution insert blocks removed.

The rotatable profile actuator 600 preferably is carried by an insert 900 that is mounted removably in a mount opening of the feedblock housing. The illustrated insert 900 is a distribution insert block that is mounted removably in mount opening 890 of the feedblock housing 100. Preferably, the rotatable profile actuator 600 is mounted on a leading end (or "working end") of the distribution insert block 900. The mount opening 890 is perhaps best shown in FIG. 2. In more detail, the illustrated distribution insert block 900 is insertable/removable into/from the mount open 890 by moving the distribution insert block along a mount/dismount axis A (see FIG. 1C). In the illustrated embodiment, the mount/dismount axis A is perpendicular to a longitudinal axis L along which the illustrated central extrusion channel 200 extends. Similarly, in FIGS. 1A-1C, the mount/dismount axis A is perpendicular to a plane along which polymer in the central extrusion channel flows.

While FIGS. 1A-1C depict an embodiment wherein the rotatable profile actuator 600 is mounted on a removable insert 900, this is not required. In other embodiments, the removable insert is omitted, and the rotatable profile actuator is mounted on (e.g., so as to be received in an elongated opening formed in) an interior wall of the feedblock housing.

Referring now to the combining plane 50, this component has generally opposed first 58 and second 52 flow-contacting surfaces. The first flow-contacting surface 58 is exposed to the central extrusion channel 200, and the second flow-contacting surface 52 is exposed to the adjacent coextrusion channel 300. This is perhaps best appreciated by referring to FIGS. 1C, 3A-3C, 8, and 10.

The combining plane 50 preferably is rotatable and wedge shaped. The illustrated combining plane 50 is rotatable to simultaneously change: i) a height of the central extrusion channel 200, and ii) a height of the adjacent coextrusion channel 300. The first flow-contacting surface 58 preferably has a convex (or generally planar) configuration, and the second flow-contacting surface 52 preferably has a concave configuration.

In the illustrated embodiments, the rotatable profile actuator 600 has a generally convex flow-contacting perimeter 165 that is exposed to the adjacent coextrusion channel 300 and confronts a concave second flow-contacting surface 52 of the adjacent combining plane 50.

Figure 3A:
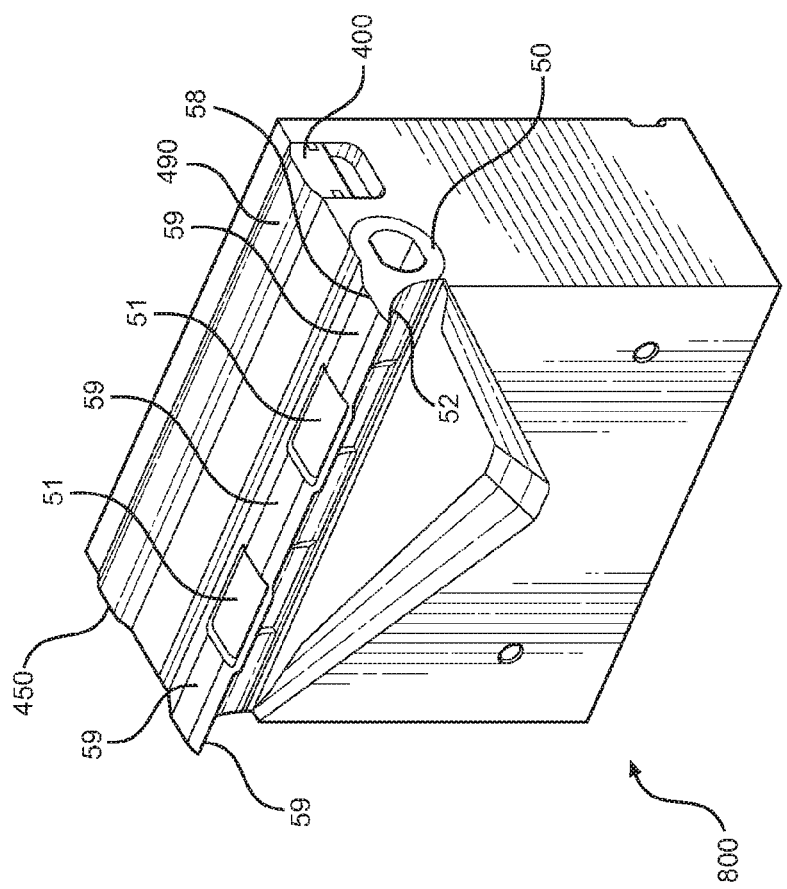
FIG. 3A is a perspective view of a removable coextrusion insert block of the coextrusion feedblock of FIG. 1A.
Figure 3B:
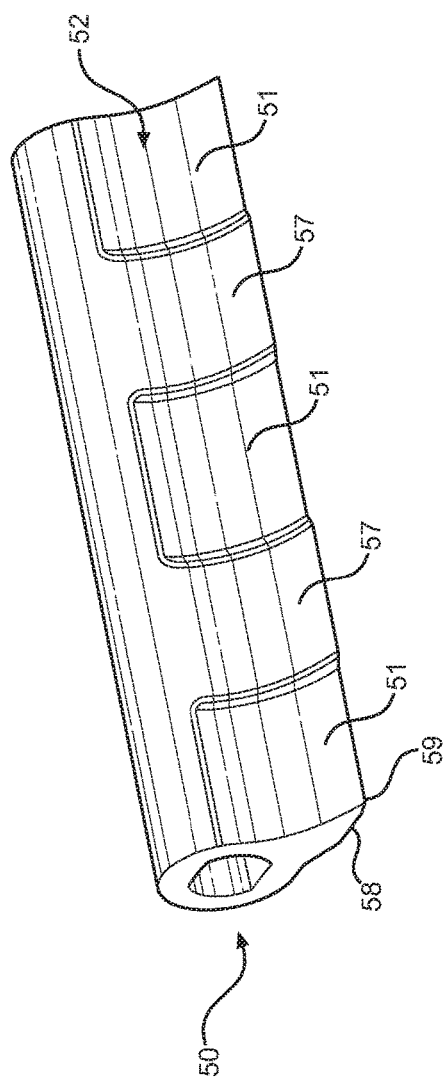
FIGS. 3B and 3C are perspective views of a combining plane of the removable coextrusion insert block of FIG. 3A.
Figure 3C:
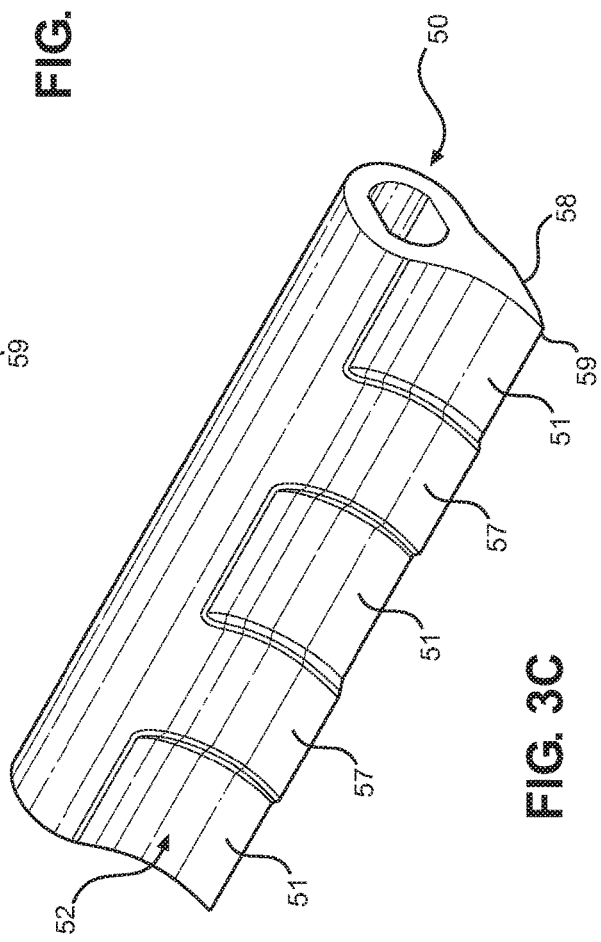

In some cases, at least one of the flow-contacting surfaces 52, 58 of the combining plane 50 is profiled, e.g., so as to have a distinctive flow-profiling contour. In FIGS. 3A-3C, the first 58 and second 52 flow-contacting surfaces of the combining plane 50 are both profiled. When provided, a profiled flow-contacting surface can optionally have one or more recessed regions and one or more raised regions. As shown in FIGS. 3A-3C, a profiled flow-contacting surface can include, for example, two recessed regions (or "channels") 51 between which there is at least one raised region (or "ridge") 57. In the embodiment of FIGS. 3A-3C, each flow-contacting surface 52, 58 has a plurality of recessed regions 51 and a plurality of raised regions 57. The recessed regions 51 and raised regions 57 are arranged alternately along the length of the illustrated combining plane 50.

In FIGS. 3A-3C, the first flow-contacting surface 58 of the combining plane 50 has a first profiled face with a first contour, the second flow-contacting surface 52 of the combining plane has a second profiled face with a second contour, and the first and second contours are different.

The illustrated combining plane configuration is characterized by the first flow-contacting surface 58 having a recessed region 51 along a certain length of the combining plane 50, while the second flow-contacting surface 52 has a raised region 57 along the same length of the combining plane. In more detail, the illustrated configuration involves a plurality of contour areas, and each of these plural contour areas comprises a raised region 57 on one side (i.e., on one of the flow-contacting surfaces) of the combining plane and a recessed region on the opposite side (i.e., on the other of the flow-contacting surfaces) of the combining plane.

In the embodiment of FIGS. 3A-3C, the first flow-contacting surface 58 has two elevation regions (or "ridges") 57 located respectively at the two opposed end regions of its length, while the second flow-contacting surface 52 has two recessed regions (or "channels") 51 located respectively at the two opposed end regions of its length.

Thus, the illustrated embodiment provides a coextrusion channel 300 having profiling components (i.e., a rotatable profile actuator 600 and a contoured rotatable combining plane 50) on opposite sides of the coextrusion channel.

While FIGS. 3A-3C depict a particular arrangement of channels and ridges, it is to be appreciated that many other profiles can be provided to accommodate different flow situations, particular processes, etc. Moreover, it is not required that either or both of the flow-contacting surfaces 52, 58 of any combining plane 50 in the feedblock 10 have a profiled/contoured shape comprising any raised or recessed regions. Instead, any one or more (e.g., all) rotatable combining planes in the feedblock 10 can optionally have entirely flat (i.e., non-contoured) flow-contacting surfaces. In such cases, the profiling of polymer flowing through the adjacent coextrusion channel can be done entirely by the adjacent rotatable profile actuator 600.

The rotatable combining plane 50 preferably has a cylindrical base region from which projects a wedge region that narrows with increasing distance from the cylindrical base region until reaching a tip 59. At the tip 59 of the rotatable combining plane 50, two polymer streams (flowing respectively from the central extrusion channel 200 and the adjacent coextrusion channel 300) come together at a combination point (or "flow-combining region"). As noted above, this is a location where multiple extrudate flows are combined. Thus, the coextrusion channel 300 has an outlet that opens into the central extrusion channel 200 adjacent a combination point.

In some cases, the rotatable combining plane 50 is constructed to rotate in response to rotation of an optional control shaft 530. The resulting rotation of the combining plane 50 is about an axis that is substantially parallel to the width of the coextrusion channel 300 (e.g., parallel to axis W). Preferably, at least one end of the control shaft 530 is externally accessible. For example, one end 531 of the control shaft 530 may serve as a controller for driving rotation of the combining plane 50. Reference is made to FIGS. 1A and 1C. As shown in FIG. 1C, the control shaft 530 (e.g., a portion thereof) can optionally have a polygonal exterior configuration matching a polygonal interior configuration of a key opening in the combining plane 50. In such cases, when the control shaft 530 is mounted in the key opening, the control shaft and combining plane 50 are keyed together for conjoint rotation.

The rotatable combining plane 50 can optionally be coupled with a lock that is configured to lock the combining plane against further rotation once the combining plane has been adjusted to a desired rotational orientation. The lock can optionally comprise a brake that, when engaged, causes the control shaft 530 to be locked against rotation. As one example, one or more lock screws can be provided adjacent to the first end 531 of the control shaft 530. By loosening such lock screw(s), the combining plane 50 is released for rotation. The combining plane 50 can then be adjusted by rotating the control shaft 530 (which conjointly rotates the combining plane) to a desired rotational orientation, at which point by tightening the lock screw(s), a brake pad or the like can be forced against the control shaft, thereby restraining it against rotation. It is to be appreciated that many other lock systems can be used.

The rotatable combining plane 50 may additionally or alternatively be adapted for use in free-floating mode, such that it rotates freely in response to polymer flow pressure differentials between the central extrusion channel 200 and the adjacent coextrusion channel 300. Thus, the rotatable combining plane may have no control shaft, or it may have a control shaft that is simply allowed to rotate freely with the combining plane. The single-piece combining plane 50 shown in the FIGs. can be replaced with a segmented combining plane, where the segments are adjustable independently.

The rotatable combining plane 50 preferably is mounted on a removable insert 800 that is received in a mount opening of the feedblock housing. In the embodiments illustrated, the rotatable combining plane 50 is mounted on a removable insert 800 different from the removable insert 900 on which the adjacent rotatable profile actuator 600 is mounted. The illustrated removable insert 800 is a coextrusion insert block that is mounted removably in mount opening 890 of the housing 100. As shown in FIG. 1C, in addition to carrying a rotatable combining plane 50, the illustrated coextrusion insert block 800 has a coextrusion channel 300 passing through it. In FIGS. 1A-1C, coextrusion insert block 800, when operably mounted in the feedblock, is upstream from the adjacent distribution insert block 900. In more detail, the illustrated feedblock housing 100 has a single opening 890 in which a coextrusion insert block 800 and an adjacent distribution insert block 900 are mounted in a side-by-side arrangement. As illustrated in FIG. 1C, a certain length of an adjacent coextrusion channel 300 extends between these two blocks 800, 900.

In the embodiment of FIGS. 1A-1C, the feedblock 10 further includes a second coextrusion channel 300, a second rotatable combining plane 50, a second rotatable profile actuator 600, and a second profiled bar 650 mounted removably on the second rotatable profile actuator. This is also the case in the embodiments of FIGS. 8 and 10. The foregoing descriptions of the first coextrusion channel 300, the first rotatable combining plane 50, the first rotatable profile actuator 600, and the first profiled bar 650 also apply to the second coextrusion channel 300, the second rotatable combining plane 50, the second rotatable profile actuator 600, and the second profiled bar 650. As one example, the second rotatable combining plane 50 preferably is wedge shaped. As another example, the second rotatable profile actuator 600 is positioned to contact (e.g., profile) polymer flowing through the second coextrusion channel 300. The illustrated first and second rotatable profile actuators 600 are positioned (e.g., to confront each other) such that the central extrusion channel 200 passes between them.

Each of the rotatable profile actuators 600 preferably comprises a rotatable profiling rod having a diameter of greater than 1 inch. While the diameter of each profiling rod will vary depending upon such variables as the size of the feedblock, each profiling rod will commonly have a diameter in the range of from 1.5 inches to 5 inches, such as about 2 inches.

In some embodiments, the feedblock 10 also has an extrusion profile tuning member 400 on, and exposed to, the central extrusion channel 200. When provided, this tuning member 400 preferably is upstream from (i.e., along the central extrusion channel) a combination point of the feedblock. The optional extrusion profile tuning member 400 can be used to refine the distribution of the polymer forming the core extrudate layer (i.e., the extrudate layer that flows through the central extrusion channel). FIGS. 1A-1C show one embodiment of this nature. As best shown in FIG. 1C, the illustrated extrusion profile tuning member 400 is adapted to project into the flow-path of the central extrusion channel 200. In more detail, the illustrated extrusion profile tuning member 400 has a profiling face 490 that projects, or is adjustable to project, into the flow-path of the central extrusion channel 200. FIG. 8 depicts a further embodiment of this nature.

When provided, the extrusion profile tuning member 400 preferably is adjustable. That is, it preferably can be adjusted so as to present different contours to polymer flowing through the central extrusion channel 200. In some cases, the adjustment can be performed in situ, i.e., while the extrusion profile tuning member 400 remains inside the feedblock housing 100. In more detail, the extrusion profile tuning member 400 preferably is configured such that its adjustment can be actuated from outside the feedblock. In the embodiments of FIGS. 1A-1C and 8, the extrusion profile tuning member 400 can be adjusted without having to remove it from the housing 100, disassemble the feedblock 10, or even stop operation of the feedblock.

In the embodiments of FIGS. 1A-1C and 8, the extrusion profile tuning member is mounted on a removable insert. In more detail, the extrusion profile tuning member 400 is mounted on the same insert 800 as is the combining plane 50. As noted above, removable insert 800 is a coextrusion insert block, which is mounted removably in mount opening 890. In the embodiments illustrated, the extrusion profile tuning member 400 and the combining plane 50 are both mounted on a leading end of the coextrusion insert block 800. In more detail, the extrusion profile tuning member 400 is mounted on a location of the coextrusion insert block 800 that, when operably mounted in the feedblock, is upstream from where the combining plane 50 is mounted on the coextrusion insert block. As shown in FIGS. 1C and 8, in addition to carrying an extrusion profile tuning member 400 and a combining plane 50, the illustrated coextrusion insert block 800 has a coextrusion channel 300 passing through it.

While FIGS. 1A-1C and 8 depict embodiments where the extrusion profile tuning member 400 is mounted on a removable insert 800, in other embodiments, the removable insert is omitted, and the extrusion profile tuning member is mounted on (e.g., so as to be received in an elongated channel formed in) an interior wall of the feedblock housing. Moreover, the extrusion profile tuning member 400 is optional, and embodiments where the feedblock 10 has no extrusion profile tuning member on the central extrusion channel are contemplated. Reference is made to the non-limiting example shown in FIG. 10.

As noted above, the illustrated extrusion profile tuning member 400 is mounted on a leading end of removable insert 800. When this insert 800 is operatively mounted in the feedblock housing 100, its leading end and its carried extrusion profile tuning member 400 are exposed to the central extrusion channel 200. In FIGS. 3A and 8, the illustrated extrusion profile tuning member 400 is mounted in an elongated channel formed in the leading end of removable insert 800.

The extrusion profile tuning member 400, when provided, preferably has a profiling face 490 that projects, or can be adjusted to project, into the flow-path of the central extrusion channel 200. In some cases, the extrusion profile tuning member 400 is pre-profiled. For example, its profiling face 490 may be machined or otherwise formed into a desired contour before being mounted inside the feedblock. Thus, in some cases, the extrusion profile tuning member 400 is not adjustable in situ.

Preferably, the extrusion profile tuning member 400 projects, or is bendable to project, into the flow-path of the central extrusion channel 200. The illustrated profile tuning member 400 comprises a restrictor bar 450. This restrictor bar 450 is elongated along the width W (see FIG. 1A) of the feedblock 10. Preferably, the restrictor bar 450 spans an entire width of the central extrusion channel 200, but does not span the entire width W of the feedblock 10. In some cases, the length of the restrictor bar 450 is greater than six inches, such as about 7 inches.

Preferably, the restrictor bar 450 is deformable to present different contours to polymer flowing through the central extrusion channel 200. In the embodiment of FIGS. 1A-1C, the restrictor bar 450 is bendable to present different contours to polymer flowing through the central extrusion channel 200. The illustrated restrictor bar 450 is constructed to be bent locally. As one example, its two opposed end regions can be bent so as to project into (or further into) the central extrusion channel 200. This may be desirable for heavy end flow situations. As another example, a middle region of the restrictor bar 450 can be bent so as to project into (or further into) the central extrusion channel 200. This may be desirable for heavy center flow situations.

Figure 4A:
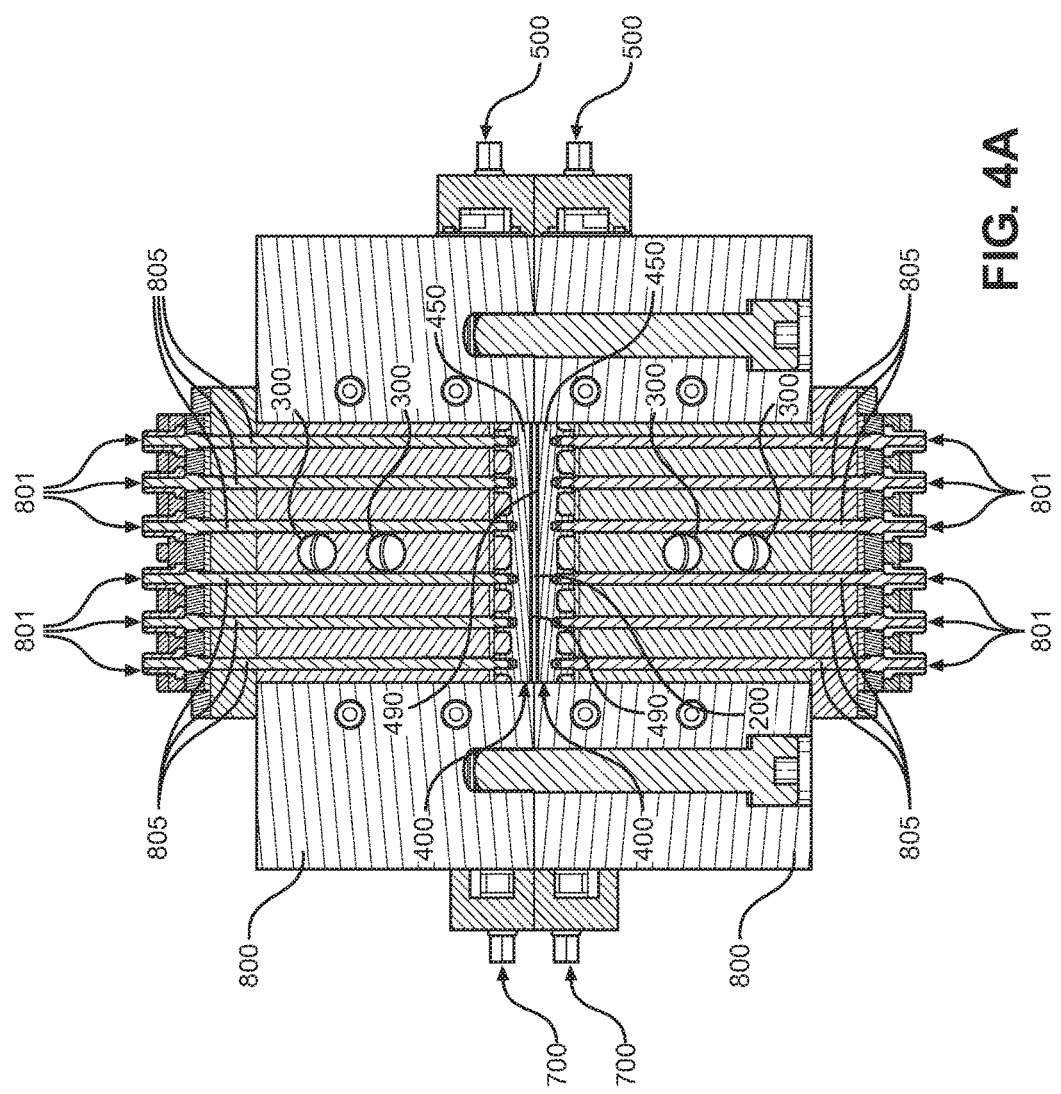
FIG. 4A is a cross-sectional view of a coextrusion feedblock housing in accordance with certain embodiments, with the removable coextrusion insert block of FIG. 3A mounted operably in the feedblock housing.
Figure 4B:
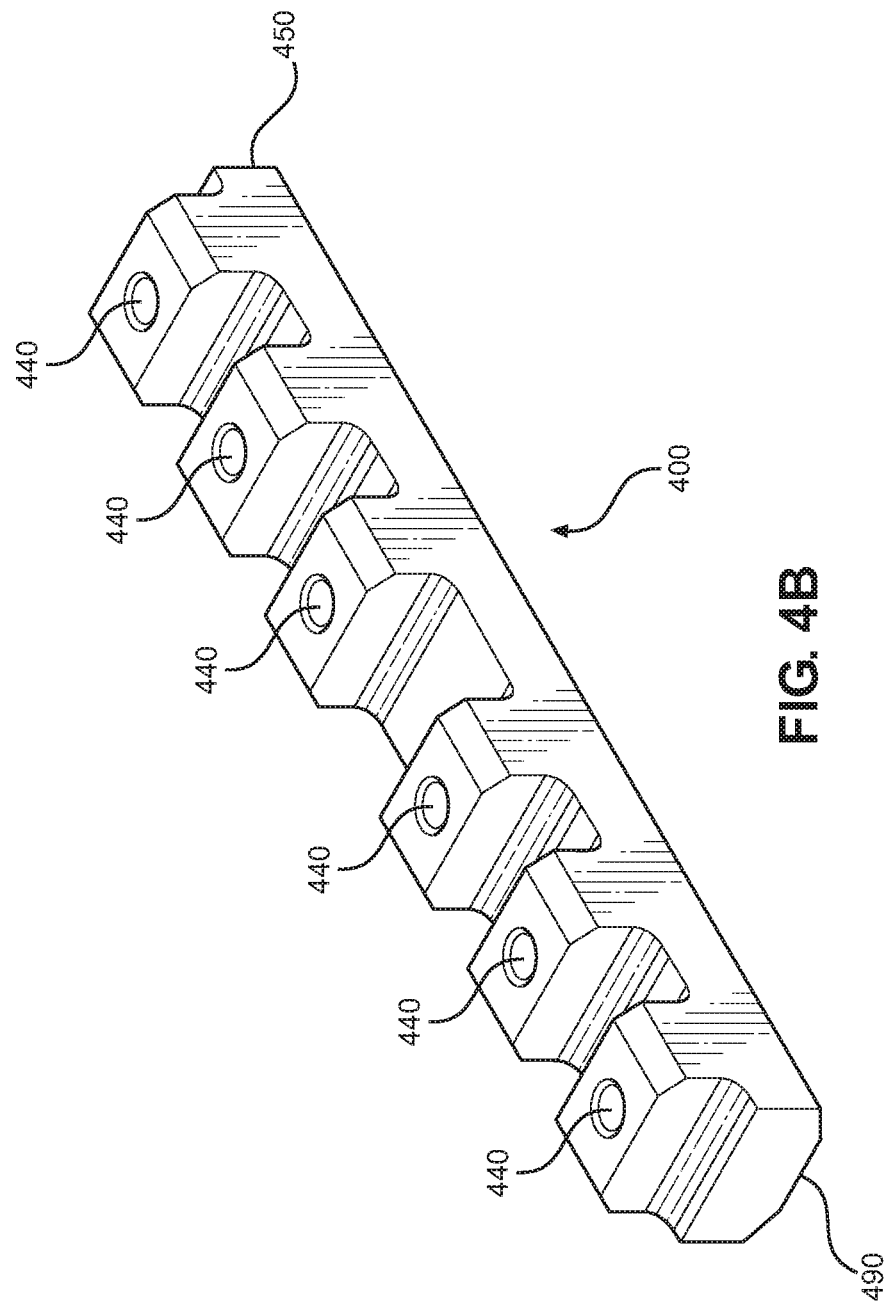
FIG. 4B is a perspective view of a restrictor bar of the removable coextrusion insert block of FIG. 3A.

FIGS. 4A-4B detail one exemplary restrictor bar configuration. The illustrated restrictor bar 450 is an elongated bar having a series of adjustor attachment points 440 spaced apart along the length of the bar. These adjustor attachment points 440 are on a side of the restrictor bar 450 opposite its profiling face 490. In the embodiment illustrated, the restrictor bar 450 has a series of shoulders that define the adjustor attachment points 440. While the embodiment of FIGS. 4A and 4B involves a restrictor bar 450 having six adjustor attachment points 440 spaced along the length of the bar, other numbers and locations can be used for the adjustor attachment points. For example, an alternate embodiment has only four adjustor attachment points spaced apart along the length of the restrictor bar. If desired, the restrictor bar can have a series of spaced-apart notches configured to increase its bendability. As described below, the desired local bending of the restrictor bar 450 preferably can be actuated from outside the feedblock.

Thus, FIG. 3A illustrates a coextrusion insert block 800 having on its leading end a bendable restrictor bar 450. Preferably, the coextrusion insert block 800 has a series of adjustment assemblies 801 attached to the restrictor bar 450 at locations spaced apart along the length of the restrictor bar, e.g., such that the restrictor bar bends locally in response to actuating one or more of the adjustment assemblies. This is best appreciated with reference to FIG. 4A. In the embodiment illustrated, each of the adjustment assemblies 801 comprises an adjustment shaft 805 anchored at one end to the restrictor bar 450, such that: (i) the restrictor bar bends in a first direction (e.g., toward or further into the central extrusion channel 200) in response to one direction of axial movement of the shaft, and (ii) the restrictor bar bends in a second direction (e.g., away from or further out of the central extrusion channel) in response to another direction of axial movement of the shaft. In more detail, the illustrated shafts 805 are threaded shafts configured such that (i) the restrictor bar 450 bends in the first direction in response to clockwise rotation of the threaded shaft, and (ii) the restrictor bar bends in the second direction in response to counterclockwise rotation of the threaded shaft.

As shown in FIG. 4A, one or more (e.g., two) coextrusion channels 300 extend between two adjustment shafts 805. This can optionally be the case for any embodiment wherein the extrusion profile tuning member 400 is provided.

In the embodiment of FIGS. 1A-1C, the adjustment assemblies 801 are externally accessible (i.e., they are configured to be actuated from outside the feedblock). This is also the case in the embodiment of FIG. 8. An operator can thus actuate any desired one or more of the adjustment assemblies from outside the feedblock, e.g., without having to open the feedblock, disassemble it, or even stop its operation. In more detail, the illustrated adjustment assemblies 801 each have an externally-accessible end. The external end of each illustrated adjustment 801 comprises a hex cap that can be rotated, e.g., using a wrench, socket, or other tool. Control of the adjustment assemblies 801 can optionally be mechanized using motors.

In the embodiments of FIGS. 1A-1C and 8, the feedblock 10 further includes a second extrusion profile tuning member 400. The foregoing description of the extrusion profile tuning member 400 also applies to the second extrusion profile tuning member 400. For example, the second extrusion profile tuning member 400 preferably is configured such that its adjustment can be actuated from outside the feedblock. In some cases, the second extrusion profile tuning member 400 is a restrictor bar that is deformable (e.g., bendable) to present different contours to polymer flowing through the central extrusion channel 200.

In FIGS. 1A-1C and 8, the two illustrated extrusion profile tuning members 400 confront each other. They are positioned to simultaneously profile (e.g., opposite sides of) a stream of polymer flowing through the central extrusion channel 200. In more detail, the two illustrated profile tuning members 400 are two restrictor bars that confront each other, and the central extrusion channel 200 passes between them. Thus, the two illustrated restrictor bars are positioned to simultaneously profile polymer flowing through the central extrusion channel.

Preferably, the second extrusion profile tuning member 400 is mounted on a second removable insert 800, which is received in a second mount opening 890 of the feedblock housing 100. In the embodiment of FIGS. 1A-1C, the two mount openings (or "pockets") 890 for inserts 800 are open to each other (e.g., are two regions of a single opening that extends entirely between top and bottom of the housing). The illustrated second insert 800 is a coextrusion insert block, e.g., of the nature described above. In the embodiments illustrated, the two coextrusion insert blocks 800 of each pair are configured to be mounted respectively in two mount openings 890 of the feedblock housing 100 so as to confront each other across the central extrusion channel 200.

In the embodiments of FIGS. 1A-1C and 8, the two illustrated coextrusion insert blocks 800 and the two respective mount openings 890 in the feedblock preferably are configured such that the coextrusion insert blocks are each insertable/removable into/from the respective mount open by moving such coextrusion insert block along a mount/dismount axis A (see FIG. 1C). As noted above, the illustrated mount/dismount axis A is perpendicular to the longitudinal axis L (and perpendicular to a plane along which polymer flows in the central extrusion channel) of the central extrusion channel 200.

Thus, in FIGS. 1A-1C and 8, the two extrusion profile tuning members 400 are mounted respectively on the two leading ends of the two removable coextrusion insert blocks 800. When these coextrusion insert blocks 800 are operatively mounted in the feedblock housing 100, their leading ends and the extrusion profile tuning members 400 they carry are exposed to the central extrusion channel 200. In more detail, the two illustrated extrusion profile tuning members 400 are mounted respectively in two elongated channels formed respectively in the leading ends of the two illustrated coextrusion insert blocks 800.

With continued reference to FIGS. 1A-1C and 8, the illustrated feedblock 10 includes two removable coextrusion insert blocks 800, each carrying both an extrusion profile tuning member 400 and a rotatable combining plane 50. In such cases, when the two coextrusion insert blocks 800 are operably mounted in two respective mount openings 890 of the feedblock housing 100, the two rotatable combining planes 50 confront each other across the central extrusion channel 200 and the two extrusion profile tuning members 400 confront each other across the central extrusion channel. Preferably, the illustrated two extrusion profile tuning members 400 and two rotatable combining planes 50 are mounted respectively on the two leading ends of the two removable coextrusion insert blocks 800. Thus, when these coextrusion insert blocks 800 are operatively mounted in the feedblock housing 100, their leading ends and the extrusion profile tuning members 400 and rotatable combining planes 50 they carry are exposed to the central extrusion channel 200.

In the embodiments illustrated, the rotatable combining planes 50 are independently adjustable. Referring to FIGS. 1A and 1C, each illustrated combining plane 50 has a control shaft 530 that extends from a first end 531 (which preferably is located outside the feedblock), through the feedblock, and to a connection with the respective combining plane 50. Each combining plane 50 is configured to rotate in response to rotation of its respective control shaft 530. The resulting rotation of a combining plane 50 simultaneously changes a height of both the central extrusion channel 200 and the adjacent coextrusion channel 300. In more detail, a height of the central extrusion channel increases while simultaneously a height of the adjacent coextrusion channel decreases, or vice versa.

In the embodiments illustrated, the height of the central extrusion channel 200 at a location entering a flow-combining region is set by a separation distance between two confronting combining planes 50.

As noted above, the central extrusion channel 200 preferably has a width of greater than 6 inches, such as about 7 inches. In addition, when provided, each restrictor bar 450 preferably has a length of greater than 6 inches, such as about 7 inches. While the dimensions of the central extrusion channel, each rotatable profile actuator, and each restrictor bar will vary depending upon such variables as the size of the feedblock, the central extrusion channel will commonly have a width in the range of from 5 inches to 10 inches, each rotatable profile actuator 600 will commonly have a length in the range of from 5 inches to 10 inches, and each optional restrictor bar 450 will commonly have a length in the range of from 5 inches to 10 inches.

In the embodiments illustrated, actuators 500, 700 comprise hex caps that can be rotated, e.g., using a wrench, socket, or other tool. Furthermore, control of actuators 500, 700 can optionally be mechanized using motors. Preferably, the feedblock 10 has gauges for actuators 500, 700. When provided, each gauge indicates the orientation of the respective rotatable combining plane 50 or rotatable profile actuator 600.

The embodiments of FIGS. 1A-1C, 8, and 10 provide a coextrusion channel 300 having profiling components (i.e., a rotatable profile actuator 600 and a contoured rotatable combining plane 50) on opposite sides of the coextrusion channel. The embodiments of FIGS. 1A-1C and 8 also provide a pair of profiling components 400 on opposite sides of the central extrusion channel 200. These combinations of profiling components provide exceptional flexibility and control in profiling a wide variety of multi-layer extrusions.

While preferred embodiments have been described, it should be understood that various changes, adaptations and modifications may be made therein without departing from the spirit and scope of the claims.

What is claimed is:

1. A coextrusion feedblock, comprising:
a housing;

a central extrusion channel;
a coextrusion channel;
a rotatable combining plane;
a rotatable profile actuator; and
a profiled bar mounted removably on said rotatable profile actuator such that the profiled bar and the rotatable profile actuator move together, wherein:
said profiled bar defines a profiling face,
said central extrusion channel and said coextrusion channel pass through said housing,
said rotatable combining plane and said rotatable profile actuator are positioned on opposite sides of said coextrusion channel so as to confront each other, and
said rotatable profile actuator is configured such that (a) rotation in a first direction increases a profiling impact said profiled bar has on polymer flowing through said coextrusion channel by causing said profiling face to move to one position in said coextrusion channel and (b) rotation of said rotatable profile actuator in a second direction decreases the profiling impact said profiled bar has on polymer flowing through said coextrusion channel by causing said profiling face to move to another position in said coextrusion channel.

2. The coextrusion feedblock of claim 1, wherein said profiling face includes one or more raised regions and is sized to extend along an entire width of said coextrusion channel.

3. The coextrusion feedblock of claim 1, wherein said rotatable profile actuator comprises a rod having a diameter of 1.5 inches or greater.

4. The coextrusion feedblock of claim 1, wherein said rotatable profile actuator comprises a rod having an axially-elongated groove in which said profiled bar is mounted removably.

5. The coextrusion feedblock of claim 1, further comprising an insert assembly, said insert assembly comprising a distribution insert block,
wherein said housing further comprises a mount opening in which said distribution insert block is removably mounted, said rotatable profile actuator mounted to said distribution insert block so as to be removable from said mount opening conjointly with said distribution insert block, and
wherein said insert assembly further comprises a coextrusion insert block mounted removably in said mount opening, said rotatable combining plane mounted to said coextrusion insert block so as to be removable from said mount opening conjointly with said coextrusion insert block, said distribution insert block and said coextrusion insert block mounted side-by-side in said mount opening.

6. The coextrusion feedblock of claim 1, further comprising an actuator that is external to said housing, said external actuator coupled with said rotatable profile actuator such that said rotatable profile actuator rotates between first and second orientations in response to actuation of said external actuator.

7. The coextrusion feedblock of claim 6, wherein said actuator comprises a control shaft attached to said rotatable profile actuator such that said rotatable profile actuator rotates in response to rotation of said control shaft, said control shaft having an end that is external to said housing.

8. The coextrusion feedblock of claim 1, wherein said rotatable combining plane has generally opposed first and second flow-contacting surfaces, said first flow-contacting surface exposed to said central extrusion channel, said second flow-contacting surface exposed to said coextrusion channel.

9. The coextrusion feedblock of claim 8, wherein said first flow-contacting surface of said rotatable combining plane has a first profiled face with a first contour, said second flow-contacting surface of said rotatable combining plane has a second profiled face with a second contour, and said first contour is different from said second contour.

10. The coextrusion feedblock of claim 8, wherein said first flow-contacting surface of said rotatable combining plane has a plurality of channels and ridges, and said second flow-contacting surface of said rotatable combining plane has a plurality of channels and ridges.

11. The coextrusion feedblock of claim 1, further comprising a second coextrusion channel, a second rotatable combining plane, a second rotatable profile actuator, and a second profiled bar mounted removably on said second rotatable profile actuator, said second rotatable combining plane and said second rotatable profile actuator positioned on opposite sides of said second coextrusion channel so as to confront each other.

12. The coextrusion feedblock of claim 1, further comprising an extrusion profile tuning member positioned to profile polymer flowing through said central extrusion channel, said rotatable combining plane being downstream from said extrusion profile tuning member, and said extrusion profile tuning member comprising a restrictor bar that is bendable to present different contours to polymer flowing through said central extrusion channel.

13. The coextrusion feedblock of claim 12, further comprising a series of adjustment assemblies attached to said restrictor bar at locations spaced apart along said restrictor bar, such that said restrictor bar bends locally in response to actuating one or more of said adjustment assemblies, each of said adjustment assemblies comprising an adjustment shaft anchored at one end to said restrictor bar, such that: (i) said restrictor bar bends in a first direction in response to one direction of axial movement of said adjustment shaft, and (ii) said restrictor bar bends in a second direction in response to another direction of axial movement of said adjustment shaft.

14. The coextrusion feedblock of claim 12, further comprising a second extrusion profile tuning member, said second extrusion profile tuning member comprising a restrictor bar that is bendable to present different contours to polymer flowing through said central extrusion channel, said two restrictor bars confronting each other, and said central extrusion channel passing between said two restrictor bars such that they are positioned to simultaneously profile polymer flowing through said central extrusion channel.

15. The coextrusion feedblock of claim 1, wherein said central extrusion channel has a width of greater than six inches.

16. The coextrusion feedblock of claim 1, further comprising a second profiled bar mounted removably on said rotatable profile actuator, said two profiled bars having two respective profiling faces of different contour and being spaced-apart from each other about a circumference of said rotatable profile actuator such that either profiled bar is positioned to profile polymer flow through said coextrusion channel by rotating said rotatable profile actuator into a desired one of first and second orientations.

17. A coextrusion feedblock, comprising:
a housing;
a central extrusion channel;
a coextrusion channel;

a rotatable combining plane;

a rotatable profile actuator;

an extrusion profile tuning member positioned to profile polymer flowing through said central extrusion channel, said rotatable combining plane being downstream from said extrusion profile tuning member, and said extrusion profile tuning member comprising a restrictor bar that is bendable to present different contours to polymer flowing through said central extrusion channel;

a series of adjustment assemblies attached to said restrictor bar at locations spaced apart along said restrictor bar, such that said restrictor bar bends locally in response to actuating one or more of said adjustment assemblies, each of said adjustment assemblies comprising an adjustment shaft anchored at one end to said restrictor bar, such that: (i) said restrictor bar bends in a first direction in response to one direction of axial movement of said adjustment shaft, and (ii) said restrictor bar bends in a second direction in response to another direction of axial movement of said adjustment shaft; and a profiled bar mounted removably on said rotatable profile actuator, wherein:

said central extrusion channel and said coextrusion channel pass through said housing, said rotatable combining plane and said rotatable profile actuator are positioned on opposite sides of said coextrusion channel so as to confront each other, and said rotatable profile actuator is configured such that (a) rotation in a first direction increases a profiling impact said rotatable profile actuator has on polymer flowing through said coextrusion channel and (b) rotation of said rotatable profile actuator in a second direction decreases the profiling impact said rotatable profile actuator has on polymer flowing through said coextrusion channel.

18. The coextrusion feedblock of claim 17, further comprising a second extrusion profile tuning member, said second extrusion profile tuning member comprising a restrictor bar that is bendable to present different contours to polymer flowing through said central extrusion channel, said two restrictor bars confronting each other, and said central extrusion channel passing between said two restrictor bars such that they are positioned to simultaneously profile polymer flowing through said central extrusion channel.

19. The coextrusion feedblock of claim 17, further comprising a second profiled bar mounted removably on said rotatable profile actuator, said two profiled bars having two respective profiling faces of different contour and being spaced-apart from each other about a circumference of said rotatable profile actuator such that either profiled bar is positioned to profile polymer flow through said coextrusion channel by rotating said rotatable profile actuator into a desired one of first and second orientations.

20. The coextrusion feedblock of claim 17, further comprising an actuator that is external to said housing, said external actuator coupled with said rotatable profile actuator such that said rotatable profile actuator rotates between first and second orientations in response to actuation of said external actuator.

* * * * *